(12) United States Patent
Srinivasan et al.

(10) Patent No.: US 12,041,285 B2
(45) Date of Patent: Jul. 16, 2024

(54) SYSTEMS AND METHODS FOR DYNAMICALLY DISPLAYING A GUIDE INTERFACE ELEMENT BASED ON A CUSTOMIZED DURATION

(71) Applicant: Rovi Guides, Inc., San Jose, CA (US)

(72) Inventors: Madhusudhan Srinivasan, Bangalore (IN); Labhala Gowtham, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/223,705

(22) Filed: Dec. 18, 2018

(65) Prior Publication Data

US 2020/0196000 A1 Jun. 18, 2020

(51) Int. Cl.
*H04N 21/262* (2011.01)
*G06F 16/9032* (2019.01)
*G06F 16/907* (2019.01)
*H04N 21/431* (2011.01)
*H04N 21/442* (2011.01)
*H04N 21/482* (2011.01)
*H04N 21/485* (2011.01)

(52) U.S. Cl.
CPC .. *H04N 21/26283* (2013.01); *G06F 16/90328* (2019.01); *G06F 16/907* (2019.01); *H04N 21/4314* (2013.01); *H04N 21/44224* (2020.08)

(58) Field of Classification Search
None
See application file for complete search history.

(56) References Cited

U.S. PATENT DOCUMENTS

| | | | |
|---|---|---|---|
| 6,563,515 B1* | 5/2003 | Reynolds | H04N 21/47 715/721 |
| 9,820,004 B1* | 11/2017 | Foerster | H04N 21/488 |
| 2007/0214228 A1 | 9/2007 | Horvitz | |
| 2016/0343351 A1* | 11/2016 | Chen | H04N 7/15 |
| 2017/0061935 A1 | 3/2017 | Rummel | |
| 2019/0075353 A1* | 3/2019 | Parampath | H04N 21/4622 |
| 2019/0098362 A1* | 3/2019 | Gutman | H04N 19/51 |
| 2020/0083973 A1* | 3/2020 | Beckett, III | G06N 20/00 |

OTHER PUBLICATIONS

Extended European Search Report for European Application No. 19217756.6, dated Apr. 22, 2020 (7 pages).
PCT International Search Report for International Application No. PCT/US2019/067239, dated Apr. 14, 2020 (12 pages).

* cited by examiner

*Primary Examiner* — Hsiungfei Peng
(74) *Attorney, Agent, or Firm* — Haley Guiliano LLP

(57) ABSTRACT

Systems and methods provided herein describe dynamically displaying a guide interface element for a customized period of time that is determined based on characteristics of the actual guide interface element to be displayed. In this way, when the timeout of the guide interface element is customized based on characteristics of the guide data, the duration engine allows sufficient time for the viewer to view and react to the guide interface element. Incidents of viewer re-launching of the guide interface element can thus be reduced to improve system processing efficiency and viewing experience.

18 Claims, 8 Drawing Sheets

SYSTEMS AND METHODS FOR DYNAMICALLY DISPLAYING A GUIDE INTERFACE ELEMENT BASED ON A CUSTOMIZED DURATION

TECHNICAL FIELD

The present disclosure is directed to guide interface displays, and more particularly to controlling display times of guide interface elements.

BACKGROUND

Conventional media guides typically offer menus to find media for consumption. Guide interfaces elements (e.g., flip menus, program information screens, etc.) are often displayed on-screen for a fixed period of time before timing out. Durations for displaying guide interface elements are usually fixed and pre-programmed into the guide interface application. Sometimes the viewer may not have enough time to react within the pre-programmed display duration and may then need to manually re-launch the guide interface element. The repeated re-launch of guide interface elements leads to inefficient system operations and also impairs the viewing experience.

SUMMARY

In view of this problem, embodiments described herein describe dynamically displaying a guide interface element for a customized period of time that is determined based on characteristics of the actual guide interface element to be displayed. Specifically, as described below, a duration engine is implemented at user equipment or a server to determine the type and/or the amount of guide data to be displayed in the guide interface element, based on which the duration engine adjusts the display duration for the guide interface element. For example, a program information element having a large amount of text, complex graphics, or multiple engageable options will be displayed longer than an interface element having an uncomplicated text. In this way, when the timeout of the guide interface element is customized based on characteristics of the guide data, the duration engine allows sufficient time for the viewer to view and react to the guide interface element. Incidents of viewer re-launching of the guide interface element can thus be reduced to improve system processing efficiency and viewing experience.

To determine a customized display duration for a specific guide interface element, the duration engine queries a display duration data table to retrieve a pre-defined time duration corresponding to a specific characteristic of the guide interface element. The characteristic of the guide interface element can include any of the amount of guide data contained the guide interface element, a type of the guide interface element, an interest level of the viewer in the guide data, etc. Each characteristic corresponds to a pre-defined time duration. For example, a relatively longer duration is pre-defined as corresponding to the characteristic of a large amount of information to be displayed, or guide data that contains a content asset that matches with an interest profile of the viewer.

Additionally, when a content asset is being played at the time when the guide interface element is requested, the duration engine evaluates the criticality level of the content asset in order to determine a pre-defined duration. When critical content (e.g., a sports game, the finale of a thriller movie, etc.) that requires close attention from the viewer is being played, a relatively shorter pre-defined duration is determined for displaying the guide interface element.

As a guide interface element may have different characteristics (e.g., a large amount of text but a low interest level, etc.), the duration engine evaluates different pre-defined durations corresponding to the different characteristics, e.g., by taking a weighted average of the corresponding pre-defined durations, or by treating a specific characteristic with priority. When the duration engine prioritizes a certain characteristic, e.g., choosing a short pre-defined duration because of concurrently played critical content, even if a large amount of text is to be displayed, additional remedial action can be taken to compensate for the shortened display duration. For example, relevant guide data can be sent to a secondary device for extended display time, or one or more items contained in the guide interface element can be highlighted to accelerate a reaction from the viewer, etc.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
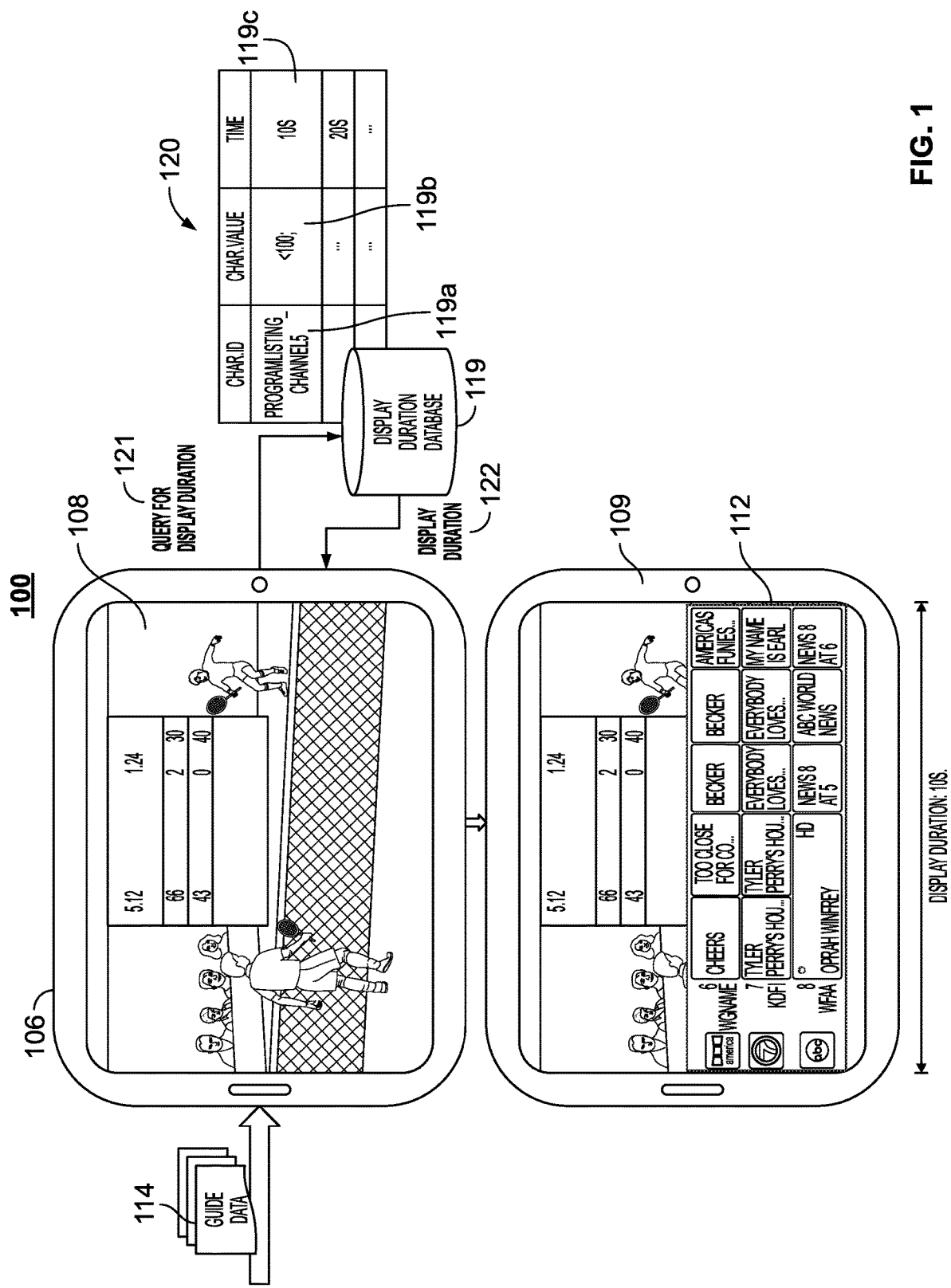
FIG. 1 depicts an illustrative embodiment illustrating aspects of displaying a guide interface element for a customized duration by querying for a pre-defined duration from a data table based on characteristics of the guide data, according to some embodiments described herein.

FIG. 1 depicts an illustrative embodiment illustrating aspects of displaying a guide interface element for a customized duration by querying for a pre-defined duration from a data table based on characteristics of the guide data, according to some embodiments described herein. Diagram 100 shows user equipment 106 on which a content asset 108 is being played on screen. User equipment 106 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a hand-held computer, a personal digital assistant (PDA), a mobile telephone, a smart phone, an intelligent wearable device, or any other smart equipment, computing equipment, or wireless device that has a display screen and/or combination of the same. In some embodiments, the user equipment 106 may have a front facing screen and a rear facing screen, multiple front screens, or multiple angled screens.

Diagram 100 further shows that the user equipment 106 obtains guide data 114, and a guide interface element 112 may be subsequently displayed on screen overlaying the content asset 108, as shown at screen 109. As referred to herein, "guide data" or "guidance data" should be understood to mean any data related to content or data used in operating the guidance application. For example, guide data 114 may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections. The guide data may be received via a communications network from a guide data source, such as a media server, a content provider, a cable network, etc. Guide interface element 112 presents guide data 114 in a certain format, such as a full-screen program listing grid, a message window, a menu window, etc.

Diagram 100 further shows a display duration database 119 that interacts with user equipment 106. Display duration database 119 may be housed locally, at an electronic storage device at the user equipment 106. Or display duration database 119 may be housed at an electronic storage device located remotely from user equipment 106 and may be accessible via a communication network. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Display duration databases 119 may also be accessed at a cloud-based storage, which may be used to supplement a local storage device or instead of the storage device. Specifically, display duration database 119 stores a data table having a list of pre-defined durations and corresponding characteristics of guide data or guide interface elements. The example data table 120 stored at display duration database 119 shows data entries including a characteristic identifier 119a of guide data, characteristic values 119b (e.g., the number of characters in the guide data as "<100," the type of the guide data ("program listing"), etc.), and a corresponding pre-defined time duration 119c ("10 seconds").

User equipment 106, display duration database 119 and/or additional entities such as a remote server providing guide data 114 interact with each other to provide a mechanism for dynamically displaying a guide interface element, e.g., on user equipment 106. Specifically, a duration engine is implemented at user equipment 106 to determine a customized display duration for each guide interface element. The duration engine may be implemented at different devices (e.g., multiple user equipment, etc.) and may communicate with each other via a communication network. Or alternatively, the duration engine may be integrated into one application running on the same device, e.g., user equipment 106. In such an approach, instructions of the duration engine are stored locally (e.g., at storage of the user equipment 106 but in communication with a remote duration database 119), and data for use by the engine is downloaded on a periodic basis (e.g., from an out-of-band feed, from an Internet resource such as the duration database 119 in). Control circuitry may be used to retrieve instructions of the duration engine from storage and process the instructions to generate any of the displays discussed herein such as the content asset 108 or guide interface element 112. Based on the processed instructions, control circuitry may determine what action to perform when input is received from input interface.

For example, user equipment 106 may receive an input invoking display of a guide interface element. The input may be received, from a viewer viewing the content asset 108, via an interface of user equipment 106. The interface may be any suitable user interface that is connected to an input/output (I/O) path, such as a remote control, mouse, trackball, keypad, keyboard, touch screen, touchpad, stylus input, joystick, voice recognition interface, or other user input interfaces. For example, user equipment 106 may receive an input, via a remote control, to display a full menu of current program listing. For another example, user equipment 106 may receive an input from a touch screen interface to display an information menu of the program currently being played (e.g., 108).

In response to the input, user equipment 106 determines guide data for populating the requested guide interface element. For example, user equipment 106 determines, based on a type of the requested guide interface element, what guide data is required, e.g., program listing information, configuration information, etc. In some implementation, user equipment 106 retrieves guide data that is stored locally, e.g., display setting configurations, playback progress bar information, etc. In some implementations, user equipment 106 receives guide data 114 from a guide data source via an input/output (I/O) path of user equipment 106. The I/O path may provide content (e.g., broadcast programming, on-demand programming, Internet content, content available over a local area network (LAN) or wide area network (WAN), and/or other content) and data to control circuitry at user equipment 106.

Upon obtaining guide data 114, user equipment 106 then populates guide data 114 into the guide interface element 112. Specifically, the duration engine determines characteristics of the guide data, based on which a customized display duration for guide interface element 112 is determined. For example, the duration engine determines the type of the characteristic, e.g., the amount of guide data, the type of guide data, the estimated interest level of the guide data, etc.; and the value of the characteristic, e.g., the amount of guide data="89 characters," the type of guide data="program listing," the estimated interest level of the guide data="0.65," etc. The duration engine may determine the characteristic identifier upon the type of the guide interface element and a program channel that the guide interface element is associated with, e.g., "programlisting_channel5" 119a. The duration engine then sends a query 121 based on the characteristics identifier of the guide data to duration database 119 and the characteristic value and retrieves a display duration 122 from database 119.

Display duration database 119 stores one or more data tables 120 that list pre-defined durations corresponding to different characteristics of a guide interface element. For example, a characteristic identifier (e.g., determined upon the type of the guide interface element and a program channel that the guide interface element is associated with, etc.) corresponds to one or more characteristics values, e.g., a range of characters contained in the guide data, a type of the interface element, an interest level of the guide data, etc. Each characteristic value is associated with a pre-defined duration. For example, as shown in FIG. 1, the characteristic identifier "programlisting_channel5" that has a characteristic value of "<100" characters corresponding to a pre-defined duration of 10 seconds (119c).

Additional examples of characteristics and corresponding pre-defined durations in the data table 120 may be provided below. Further details on determining a display duration based on different characteristics are further described in relation to FIGS. 2-5.

TABLE 1

Example Duration Data Table

| Characteristic ID | Characteristic Value | Time |
|---|---|---|
| Programlisting_channel5 | <100 | 10 s |
| ... | >100, <200 | 30 s |
|  | ... | ... |
|  | Interest level = high | 20 s |
|  | Interest level = low | 10 s |
|  | ... | ... |
|  | Criticality = high | 5 s |
|  | Criticality = low | 20 s |
|  | ... | ... |
| Controlbar_channel5 | <50 | 5 s |
|  | ... | ... |

Upon determining display duration 122, user equipment 106 generates for display, the guide interface element 112 for the determined display duration 122. For example, user equipment 106 selects a guide interface format (e.g., a full screen program listing grid, a flip menu, etc.) for the type of guide data 114, and populates guide data 114 into the interface format. User equipment 106 terminates the display of interface element 112 after the determined display duration 122, e.g., 10 seconds.

FIGS. 2-5 provide various examples of different scenarios illustrating guide interface elements having different characteristics and the corresponding pre-defined duration determined based on the specific characteristics.

Figure 2:
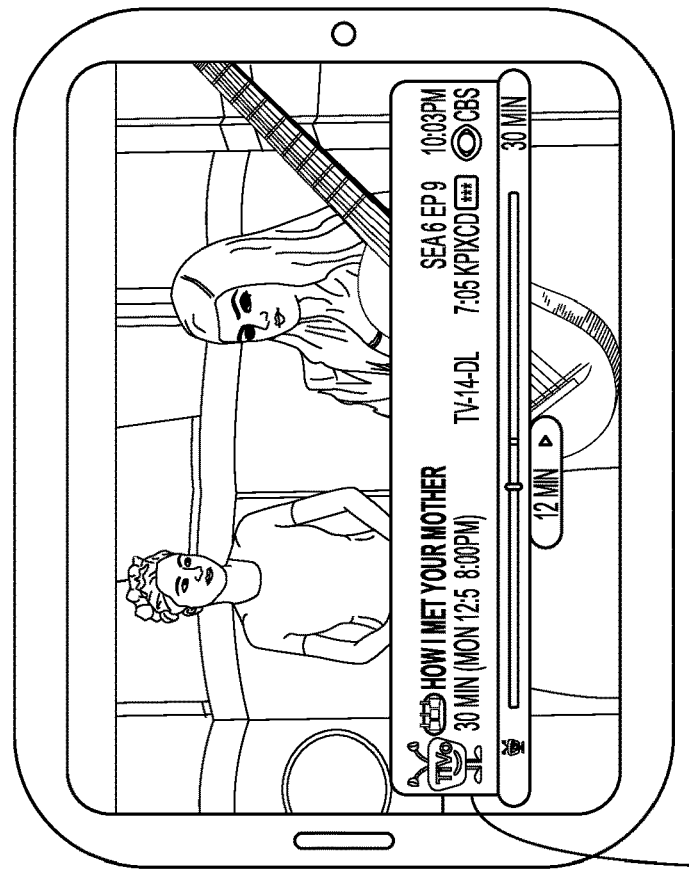
FIG. 2 depicts an illustrative embodiment illustrating aspects of determining the customized duration based on the amount or type of guide data contained in the guide interface element, in accordance to embodiment described in FIG. 1.
Figure 2:
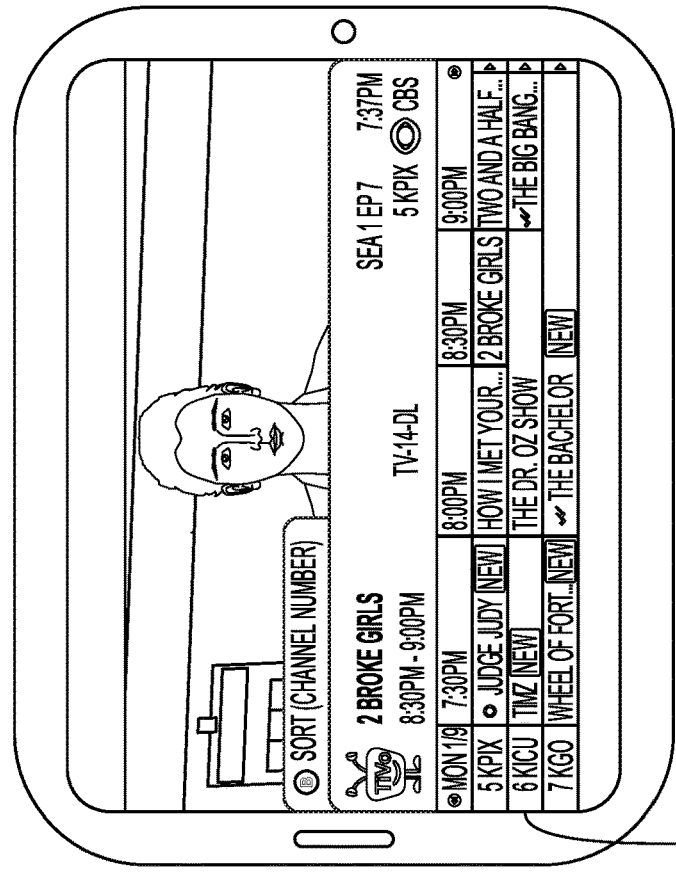

FIG. 2 depicts an illustrative embodiment illustrating aspects of determining the customized duration based on the amount or type of guide data contained in the guide interface element, in accordance to embodiments described in FIG. 1. The characteristic of guide data 114 can be indicative of an amount of information contained in the guide data. For example, the amount of information may include, but not limited to a total number of characters contained in the guide data, a total number of channels contained in the guide data, a total number of time grids contained in the guide data, a total number of content assets contained in the guide data, an amount of graphic elements, a number of engageable elements, etc. A longer pre-defined duration (e.g., 30 seconds) is assigned to display guide data having a larger amount of information. For example, as shown at 201, guide interface element 112a, which shows the program schedule of a TV show "2 Broke Girls" on different channels, has a large amount of text and is assigned a pre-defined display duration of 30 seconds. As shown at 202, guide interface element 112b provides a progress bar that contains much less text and is thus assigned to s shorter duration of 15 seconds.

In some embodiments, the characteristic of the guide data can be indicative of a type of the guide data. For example, guide interface element 112a, which shows the program schedule that includes a more complex format than guide interface element 112b which is a progress bar, is assigned a longer display duration.

Figure 3:
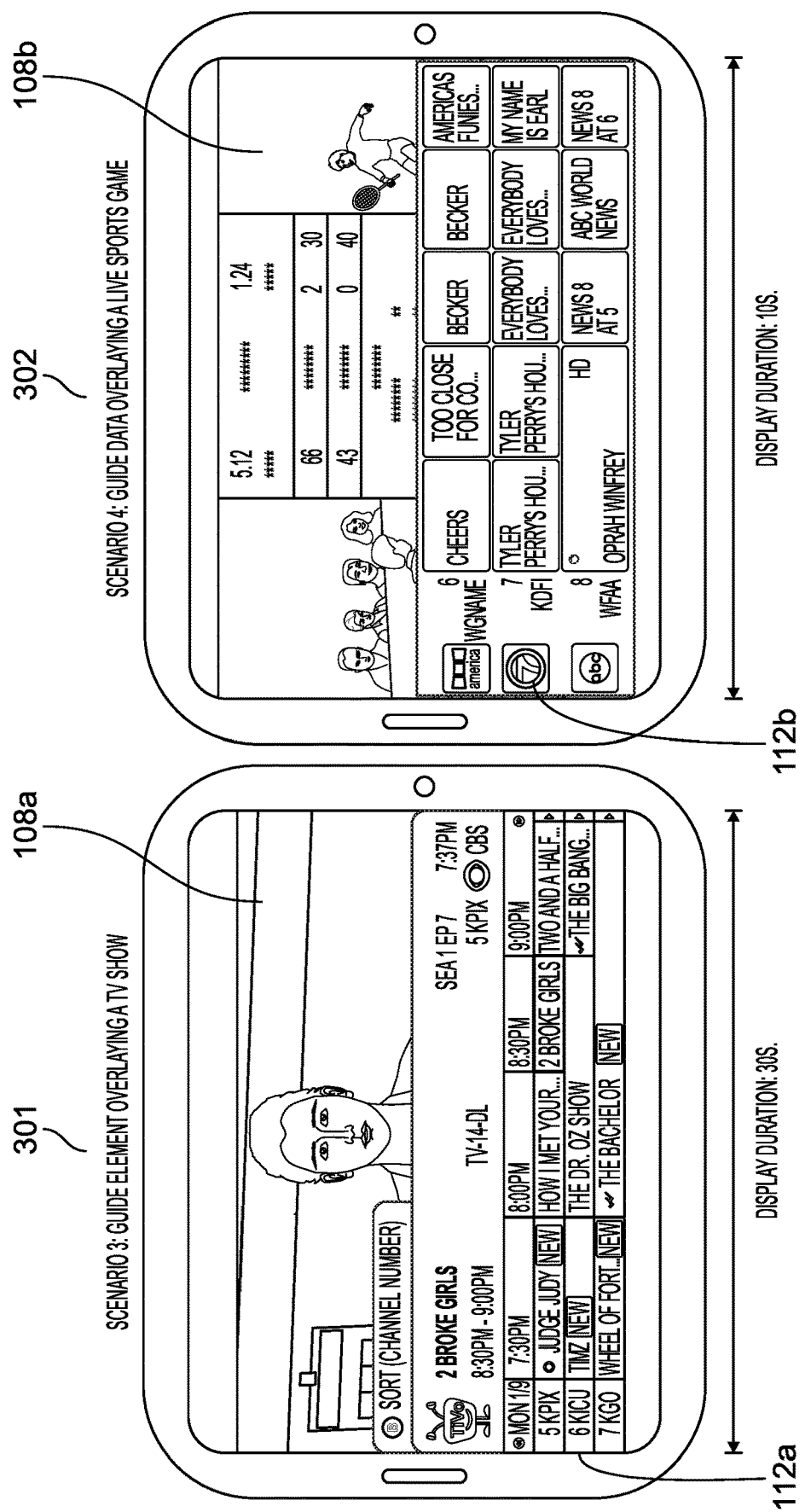
FIG. 3 depicts an illustrative embodiment illustrating aspects of determining the customized duration based on the criticality of the content being concurrently played, in accordance to embodiment described in FIG. 1.

FIG. 3 depicts an illustrative embodiment illustrating aspects of determining the customized duration based on the criticality of the content being concurrently played, in accordance to embodiments described in FIG. 1. When the input to launch a guide interface element is received while a content asset is being played, the criticality level of the content that is being played is considered in determining the display duration. For example, at 301, when a comedy show 108a without critical or time-sensitive content is being played, guide interface element 112a is assigned a relatively longer duration of 30 seconds. At 302, when an intense tennis match 108b that requires a high level of attention is played, guide interface element 112b is assigned a relatively shorter duration of 10 seconds. Further discussion on determining the display duration based on the criticality level of the content asset is provided in FIG. 8.

Figure 4:
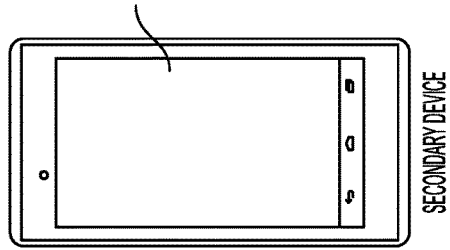
FIG. 4 depicts an illustrative embodiment illustrating aspects of sending the guide data to a secondary device when the display duration of the guide interface element is shortened dur to the criticality of the content begin played, in accordance to embodiment described in FIG. 1.
Figure 4:
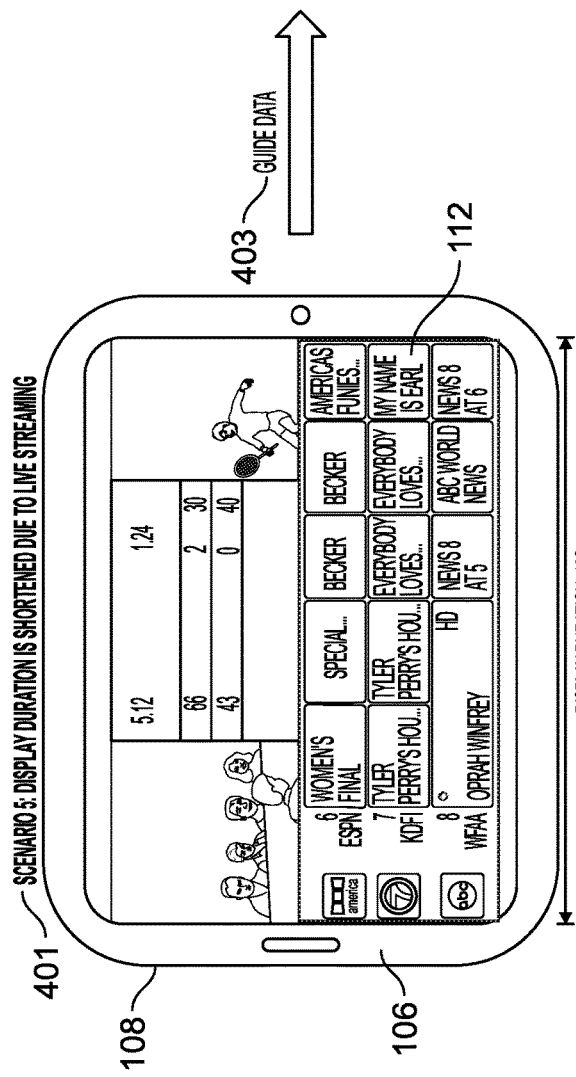
Figure 5:
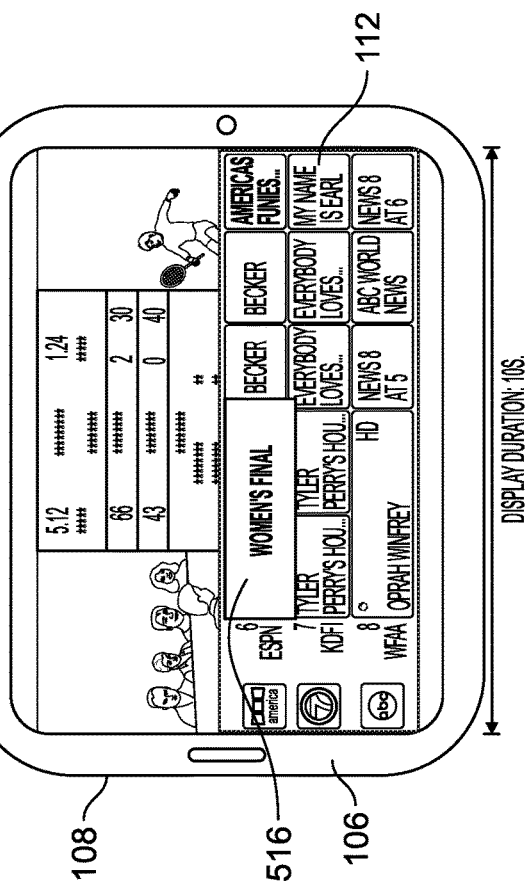
FIG. 5 depicts an alternative embodiment illustrating aspects of highlighting a portion of the guide interface element to accelerate viewer reaction when the display duration of the guide interface element is shortened due to the criticality of the content begin played, in accordance to embodiment described in FIG. 1.

FIGS. 4-5 depicts illustrative embodiments illustrating scenarios when a guide interface element has different characteristics that correspond to different display durations (e.g., on data table 120), in accordance to embodiment described in FIG. 1. A guide interface element may have different characteristics (e.g., number of characters, number of content assets, number of grids, type of the interface element, an interest level of the guide data, a criticality of the content asset being played, etc.). Each characteristic may correspond to a pre-defined duration as shown in Table 1. Thus, to determine the display duration for a guide interface element having multiple characteristics, the duration engine queries the duration database (e.g., database 119) to retrieve a set of pre-defined durations, each of which corresponds to a specific characteristic value from the multiple characteristics. The duration engine may then compute a weighted average of the set of pre-defined durations as the display duration for the guide interface element.

In some embodiments, when two or more characteristics yield conflicting scenarios of pre-defined durations, the duration engine may prioritize a specific characteristic and adopt the respective pre-defined duration corresponding to the specific characteristic. For example, as shown at 401, when an intense tennis match 108 is being played when the guide interface element 112 is requested, the duration engine assigns a short pre-defined duration of 10 seconds to the guide interface element 112, even if the amount of text contained in the guide interface element 112 corresponds to a longer pre-defined duration. To compensate for the shorted display duration of the guide interface element 112, the duration engine may perform remedial actions. For example, as shown at 401, guide data 403 may be delivered to a secondary device 410, which includes any of a personal computer, laptop computer, mobile device, Smart phone, Smart wearable device, and/or other processing device. The secondary device 410 may provide an extended display of the guide data 403.

For another example, as shown in FIG. 5, at 501, the duration engine may change the format of the guide interface element 112 to highlight one or more items (e.g., the title of the program "Woman's Final") 516 shown in the guide interface element to accelerate a reaction from the viewer.

FIGS. 6-9 provide example flowcharts illustrating various processes implemented by the duration engine as discussed throughout the disclosure. Processes 600-900 may be executed by control circuitry (e.g., control circuitry that is configured to control, instruct or implement the duration engine implemented at user equipment 106). Control circuitry may be part of user equipment 106, or of a remote server separated from user equipment 106 by way of a communications network. Specifically, control circuitry may be based on any suitable processing circuitry and comprises control circuits and memory circuits which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software.

Figure 6:
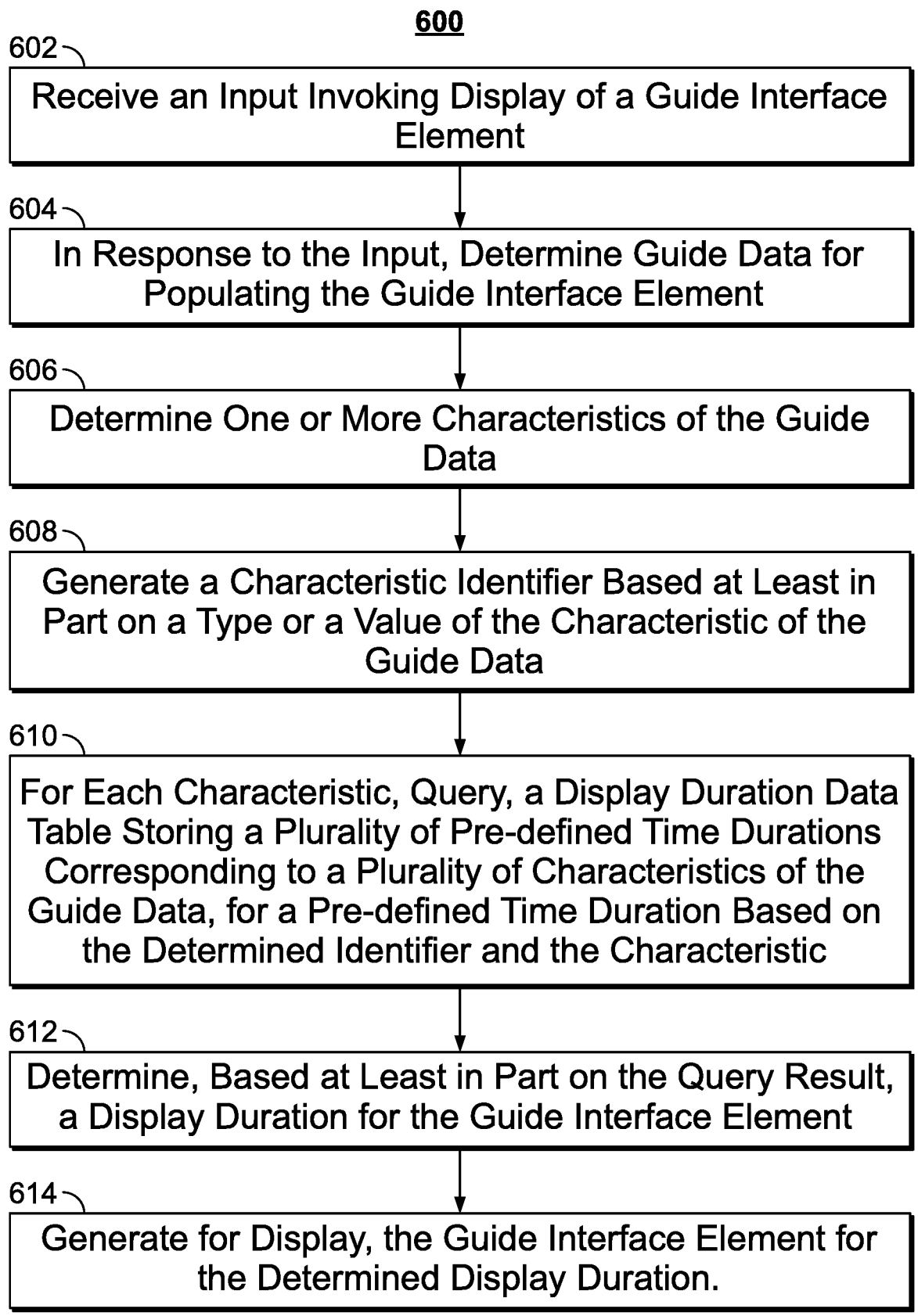
FIG. 6 depicts an illustrative flowchart of a process for determining a customized display duration for a guide interface element based on characteristics of the guide interface element, in accordance with some embodiments of the disclosure.

FIG. 6 depicts an illustrative flowchart of a process for determining a customized display duration for a guide interface element based on characteristics of the guide interface element, in accordance with some embodiments of the disclosure. Process 600 begins at 602, where control circuitry receives an input invoking display of a guide interface element. For example, control circuitry receives a control signal, via communication circuitry, from a personal device such as a remote control to request the display of program information of the program that is being played. For another example, control circuitry obtains sensor data from a touch screen interface, indicative of an engagement of an option to display a guide interface element. At 604, in response to the input, control circuitry determines guide data for populating the guide interface element. For example, control circuitry determines a type of the guide interface element indicated in the input, such as an element identifier, an element type, etc., and then based on the element identifier or type, determines what kind of guide data (e.g., 114) is required. At 606, control circuitry determines one or more characteristics of the guide data. As discussed in relation to FIG. 1, the characteristics may include an amount of information contained in the guide data, type of the interface element, an interest level of the guide data, etc. For example, control circuitry determines a count of characters contained in the guide data. For another example, control circuitry reads, from a data structure corresponding to the requested guide interface element, a data field indicative of the type of the guide interface element. Other examples of characteristics such as an interest level or a criticality level are described in relation to FIGS. 7-8.

At 608, control circuitry generates a characteristic identifier based at least in part on a type or a value of the characteristic of the guide data. For example, control circuitry extracts the value from a data field indicative of a type of the guide interface element, and/or the value from a data field indicative of a channel that is being played, based on which a hash is computed as the identifier for the characteristics of the guide interface element.

At 610, for each characteristic, control circuitry queries, a display duration data table (e.g., 120) storing a plurality of pre-defined time durations (e.g., 119*c*) corresponding to a plurality of characteristics (e.g., 119*a-b*) of the guide data, for a pre-defined time duration based on the determined identifier and the characteristic. For example, as shown in FIG. 1, control circuitry sends a query 121 to the duration database 119, via a data bus, or via a communication network when the duration database 119 is located remotely from user equipment 106.

At 612, control circuitry determines, based at least in part on the query result (e.g., 122), a display duration for the guide interface element. At 614, control circuitry generates for display, the guide interface element for the determined display duration. For example, as shown in FIG. 1, control circuitry displays the interface element 112 for 10 seconds.

Figure 7:
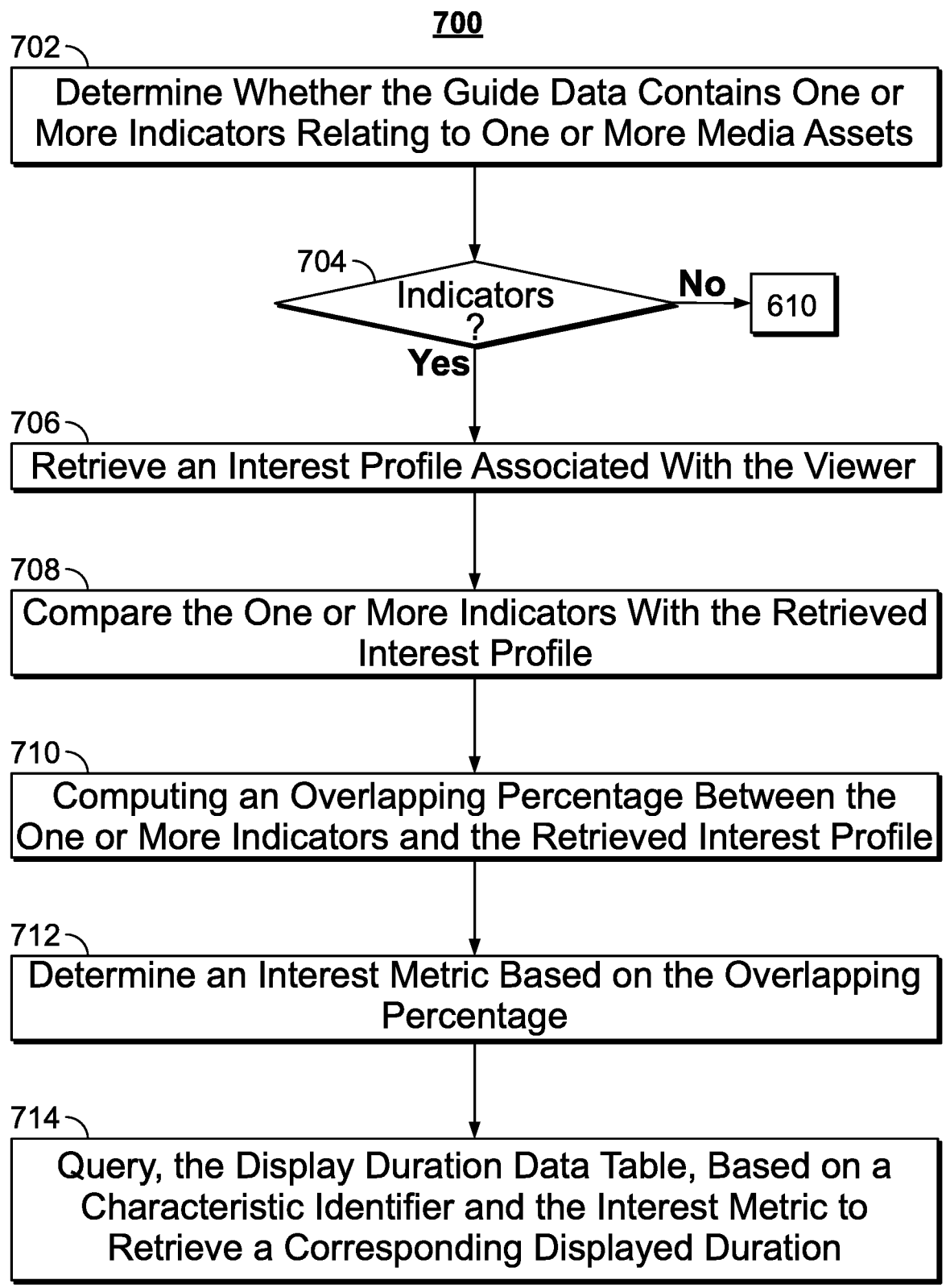
FIG. 7 depicts an illustrative flowchart of a process for determining a characteristic indicative of an interest level in the guide data, in accordance with some embodiments of FIG. 6.

FIG. 7 depicts an illustrative flowchart of a process for determining a characteristic indicative of an interest level in the guide data, in accordance with some embodiments of 606 in FIG. 6. Process 700 starts with 702, where control circuitry determines whether the guide data contains one or more indicators relating to one or more content assets. For example, control circuitry retrieves one or more data values corresponding to data fields indicative of a content asset title from a structured data file of the guide data. At 704, when there are one or more indicators relating to one or more content assets, process 700 proceeds to 706; otherwise, when no indicator relating to content assets, process 700 proceeds to 610 in FIG. 6 to determine the display duration based on other characteristics.

At 706, control circuitry retrieves an interest profile associated with the viewer. For example, the interest profile takes a form of a structured data file that has a list of terms indicative of content that the viewer is interested in.

At 708, control circuitry compares the one or more indicators with the retrieved interest profile. For example, when the indicator shows "Women's Final," "ESPN," and the interest profile has an interested item of "tennis," control circuitry identifies a match between the indicator and the interest profile.

At 710, control circuitry computes an overlapping percentage between the one or more indicators and the retrieved interest profile. For example, the overlapping percentage is computed as the number of characters that match the interest profile divided by the total characters in the guide data.

At 712, control circuitry determines an interest metric based on the overlapping percentage. For example, control circuitry decides a "low" interest level when the overlapping percentage is below a threshold, or a "high" interest level when the overlapping percentage is higher than the threshold.

At 714, control circuitry queries, the display duration data table, based on a characteristic identifier and the interest metric to retrieve a corresponding displayed duration. For example, as shown in Table 1, control circuitry retrieves corresponding durations based on a "low" or "high" interest level.

Figure 8:
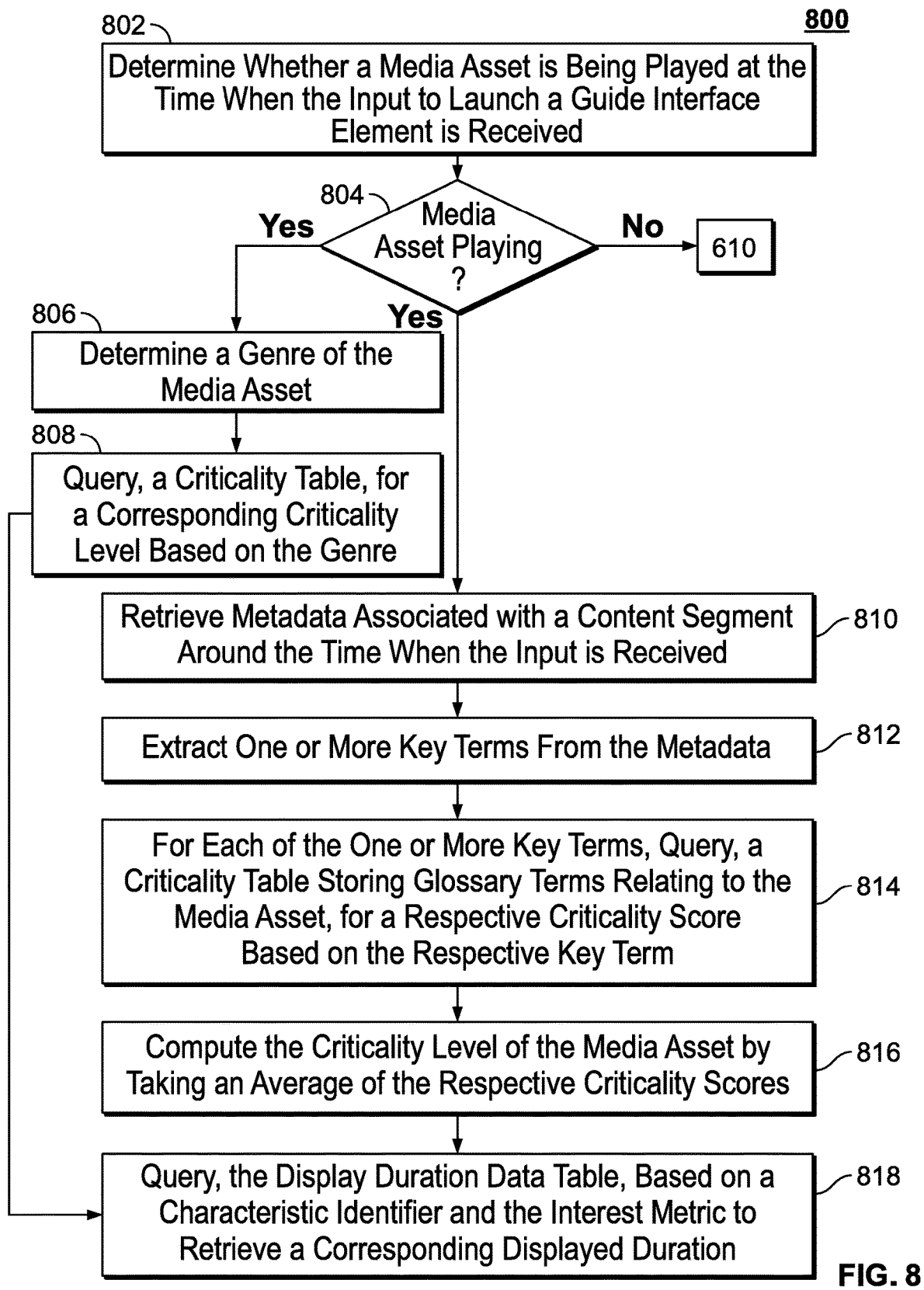
FIG. 8 depicts an illustrative flowchart of a process for determining a characteristic indicative of an interest level in the guide data, in accordance with some embodiments of FIG. 6.

FIG. 8 depicts an illustrative flowchart of a process for determining a characteristic indicative of an interest level in the guide data, in accordance with some embodiments of 606 in FIG. 6. At 802, control circuitry determines whether a content asset is being played at the time when the input to launch a guide interface element is received. At 804, when a content asset is being played, process 800 proceeds to 806 and/or 810 in parallel or in sequence. For example, control circuitry can determine a criticality level via steps 806-808 and/or steps 810-816 alternatively, interchangeably or in parallel. Otherwise, when no content asset is being played, process 800 proceeds to 610.

At 806, control circuitry determines a genre of the content asset. For example, control circuitry retrieves genre information from metadata associated with the content asset. For another example, control circuitry queries a content asset database based on an identifier of the content asset for genre information, e.g., sports event, comedy, etc.

At 808, control circuitry queries a criticality table for a corresponding criticality level based on the genre. For example, a genre entry of "tennis match" may be assigned with a high criticality value in the criticality table. For another example, a genre entry of "comedy" may be assigned with a low criticality value in the criticality table. Process 800 then proceeds to 818.

At 810, control circuitry retrieves metadata associated with a content segment around the time when the input is received. For example, control circuitry determines a time duration of a pre-defined length (e.g., 5 seconds, 10 seconds, etc.) between a first playback position and a second playback position during which the input was received. At 812, control circuitry extracts one or more key terms from the metadata. For example, control circuitry obtains the key terms from caption data corresponding to the time duration. For another example, control circuitry performs frame analysis on the content segment to obtain the one or more key terms, e.g., the displayed score box during a tennis match.

At 814, for each of the one or more key terms, control circuitry queries, the criticality table storing glossary terms relating to the content asset, for a respective criticality score based on the respective key term. For example, when the one or more key terms include "break point," "final," etc., control circuitry retrieves criticality scores corresponding to the key terms "break point" (e.g., a score of 0.75) and "final" (e.g., a score of 0.65).

At 816, control circuitry computes the criticality level of the content asset by taking an average of the respective criticality scores. In the above example, when the key terms include "break point" and "final, a criticality level of 0.7 is computed.

At 818, control circuitry queries, the display duration data table, based on a characteristic identifier and the criticality level to retrieve a corresponding displayed duration. For example, as shown in Table 1, control circuitry retrieves corresponding durations based on the criticality level.

Figure 9:
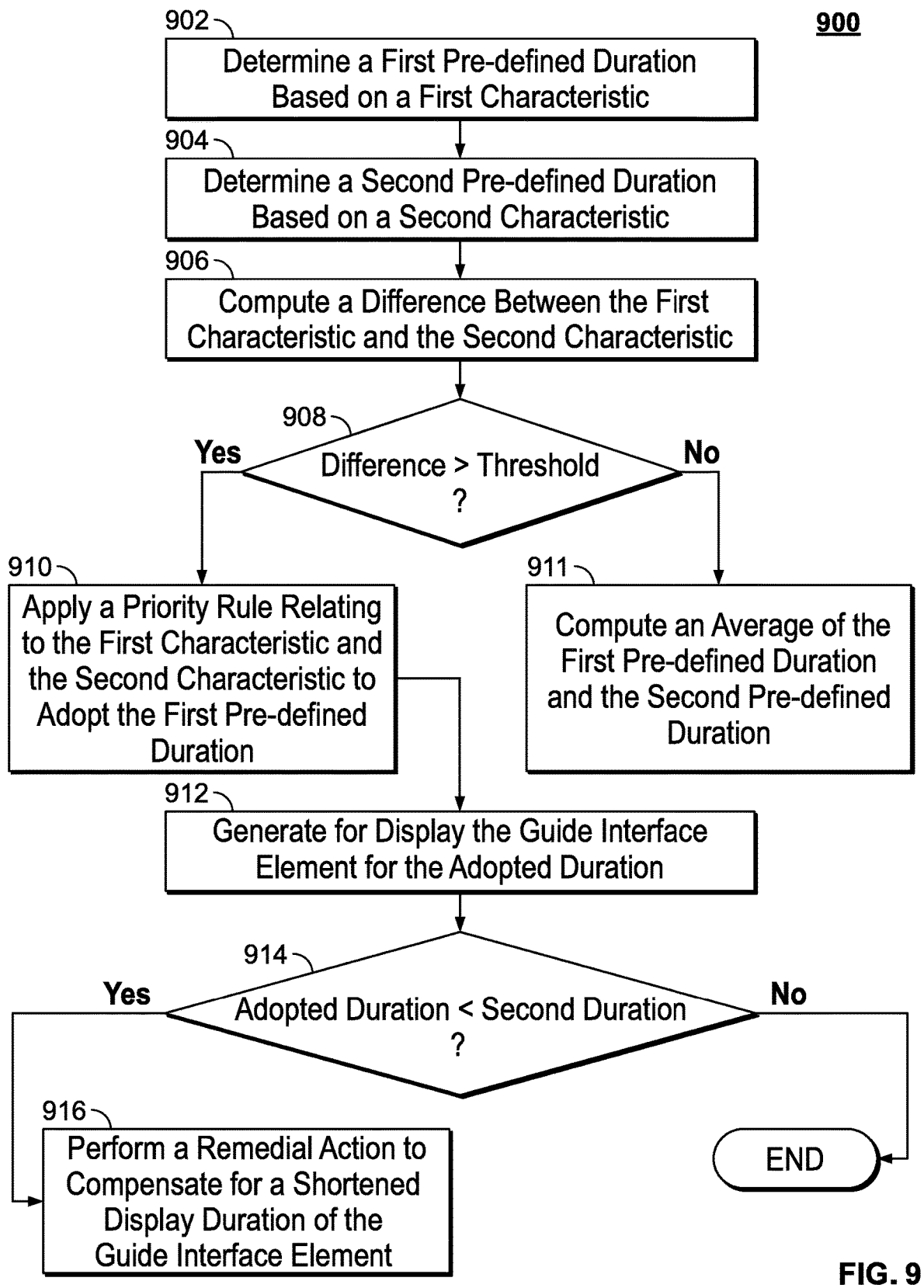
FIG. 9 depicts an illustrative flowchart of a process for determining a display duration based on different types of characteristics, in accordance with some embodiments of process described in FIG. 6."

FIG. 9 depicts an illustrative flowchart of a process for determining a display duration based on different types of characteristics, in accordance with some embodiments of process 600 described in FIG. 6. At 902, control circuitry determines a first pre-defined duration based on a first characteristic. For example, control circuitry determines (e.g., based on Table 1) a duration of 30 seconds based on a total character count of 132 in the guide data.

At 904, control circuitry determines a second pre-defined duration based on a second characteristic. For example, as shown in Table 1, control circuitry determines a duration of 5 seconds based on a "high" criticality level, e.g., when the content asset being played contains key terms such as "break point," "final" in the metadata around the time when the input to launch the guide interface element is received.

At 906, control circuitry computes a difference between the first pre-defined duration and the second pre-defined duration. In the above example, a difference of 25 seconds is computed. At 908, control circuitry determines whether the difference is greater than a threshold. For example, when the difference between the two pre-defined durations is less than a threshold (e.g., 3 s, 5 s, etc.), process 900 proceeds to 911, where control circuitry computes an average of the first pre-defined duration and the second pre-defined duration. Or when the difference between the two pre-defined durations is greater than the threshold, process 900 proceeds to 910, where control circuitry applies a priority rule relating to the first characteristic and the second characteristic to adopt the first pre-defined duration. In the above example, the difference of 25 seconds is significant and greater than the threshold (e.g., 3 s, 5 s, etc.), control circuitry retrieves a priority rule that prioritizes the corresponding duration with the criticality level. The priority rule resolves the conflict with an intention to minimize obstruction of viewing experience of a critical content segment. In this case, control circuitry adopts the duration of 5 seconds to display the guide interface element at 912.

At 914, control circuitry determines whether the adopted duration is less than the second duration. For example, after the priority rule is applied, control circuitry determines whether the adopted duration of 5 seconds is less than the duration of 30 seconds determined based on the total count of characters in the guide data. When the adopted duration is no less than the second duration, process 900 ends. Otherwise, when the adopted duration is no less than the second duration, indicating that a pre-defined duration corresponding to a specific characteristic has been de-prioritized, process 900 proceeds to 916, where control circuitry performs a remedial action to compensate for a shortened display duration of the guide interface element, e.g., as shown in FIGS. 4-5.

It is contemplated that the actions or descriptions of each of FIGS. 6-9 may be used with any other embodiment of this disclosure. In addition, the actions and descriptions described in relation to FIGS. 6-9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-5 could be used to perform one or more of the actions in FIGS. 6-9.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry. The processing circuitry, for instance, may be a general-purpose processor, a customized integrated circuit (e.g., an ASIC), or a field-programmable gate array (FPGA) within the content construction engine or the media destruction engine described through the disclosure. Furthermore, processing circuitry, or a computer program, may update configuration data, which may be stored at a storage within the user equipment 106.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for dynamically displaying a guide interface element, the method comprising:
   receiving, while a content asset is being played, an input invoking display of a guide interface element overlaid on the content asset;
   in response to the input:
      determining guide data for populating the guide interface element;
      determining a criticality level of the content asset, including obtaining a genre of the content asset, at a time when the input is received, wherein the criticality level is based on metadata of the content asset indicating a level of attention required from a viewer based on information describing the content asset;
      determining, based at least in part on the criticality level and a characteristic of the guide data including an indicator of an amount of information contained in the guide data, a display duration for the guide interface element based at least in part on a pre-defined duration associated with the indicated amount of information contained in the guide data, the amount of information comprising a number of characters contained in the guide data, a total number of channels contained in the guide data, a total number of time grids contained in the guide data, a total number of content assets contained in the guide data, an amount of graphic elements, or a number of engageable elements; and
      generating for display, overlaid on the content asset, the guide interface element for the determined display duration.

2. The method of claim 1, wherein the determining, based at least in part on the characteristic of the guide data, the display duration for the guide interface element comprises:
   determining an identifier based at least in part on a type or a value of the characteristic of the guide data;
   querying, a display duration data table storing a plurality of pre-defined time durations corresponding to a plurality of characteristics of the guide data, for a pre-defined time duration based on the determined identifier; and
   retrieving, from the display duration data table, the pre-defined time duration as the display duration.

3. The method of claim 1, wherein the amount of information is the total number of content assets contained in the guide data.

4. The method of claim 1, wherein the characteristic of the guide data further comprises an indicator of a type of the guide data, and the method further comprises:
   determining a corresponding type of the guide interface element based on the type of the guide data; and
   retrieving a pre-defined duration associated with the determined corresponding type of the guide interface element as the display duration.

5. The method of claim 1, wherein the characteristic of the guide data further comprises an indicator of an interest level in information contained in the guide data, and the method further comprises:
   identifying, from the guide data, one or more indicators relating to one or more content assets;
   comparing the one or more content assets with an interest profile;
   determining an interest metric reflecting a matching level between the one or more content assets and the interest profile based on the comparing; and
   determining the display duration based on the interest metric.

6. The method of claim 1, wherein the determining the criticality level of the content asset at a time when the input is received comprises:
   determining a genre of the content asset; and
   querying, a criticality table, for a corresponding criticality level based on the genre.

7. The method of claim 1, wherein the determining the criticality level of the content asset at a time when the input is received comprises:
   retrieving metadata associated with a content segment around the time when the input is received;
   extracting one or more key terms from the metadata;
   for each of the one or more key terms, querying a criticality table storing glossary terms relating to the content asset for a respective criticality score based on the respective key term; and
   computing the criticality level of the content asset by taking an average of the respective criticality scores.

8. The method of claim 1, further comprising:
   determining a first pre-defined duration based on the criticality level of the content asset;
   determining a second pre-defined duration based on the characteristic of the guide data;
   in response to determining that the second pre-defined duration is shorter than the first pre-defined duration, generating for display, overlaid on the content asset, the guide interface element for the second display duration; and
   in response to determining that the second pre-defined duration is longer than the first pre-defined duration:
      generating for display, overlaid on the content asset, the guide interface element for the first display duration; and performing a remedial action to compensate for a shortened display duration of the guide interface element.

9. The method of claim 8, wherein the performing the remedial action to compensate for the shortened display duration of the guide interface element comprises:
sending information relating to the guide data to a secondary device; or
adjusting a format of the guide interface element to highlight one or more items contained in the guide data.

10. A system for dynamically displaying a guide interface element, the system comprising:
memory;
input-output (I/O) circuitry; and
control circuitry configured to:
receive, via the I/O circuitry while a content asset is being played, an input invoking display of a guide interface element overlaid on the content asset;
in response to the input:
determine guide data for populating the guide interface element;
determine a criticality level of the content asset, including obtaining a genre of the content asset, at a time when the input is received, wherein the criticality level is based on metadata of the content asset indicating a level of attention required from a viewer based on information describing the content asset;
determine, based at least in part on the criticality level and a characteristic of the guide data including an indicator of an amount of information contained in the guide data, a display duration for the guide interface element based at least in part on a pre-defined duration associated with the indicated amount of information contained in the guide data, the amount of information comprising a number of characters contained in the guide data, a total number of channels contained in the guide data, a total number of time grids contained in the guide data, a total number of content assets contained in the guide data, an amount of graphic elements, or a number of engageable elements; and
generate for display, overlaid on the content asset, the guide interface element for the determined display duration.

11. The system of claim 10, wherein the control circuitry is further configured to determine, based at least in part on the characteristic of the guide data, the display duration for the guide interface element by:
determining an identifier based at least in part on a type or a value of the characteristic of the guide data;
querying, a display duration data table storing a plurality of pre-defined time durations corresponding to a plurality of characteristics of the guide data, for a pre-defined time duration based on the determined identifier; and
retrieving, from the display duration data table, the pre-defined time duration as the display duration.

12. The system of claim 10, wherein the amount of information is the total number of content assets contained in the guide data.

13. The system of claim 10, wherein the characteristic of the guide data further comprises an indicator of a type of the guide data, and the control circuitry is further configured to:
determine a corresponding type of the guide interface element based on the type of the guide data; and
retrieve a pre-defined duration associated with the determined corresponding type of the guide interface element as the display duration.

14. The system of claim 10, wherein the characteristic of the guide data further comprises an indicator of an interest level in information contained in the guide data, and the control circuitry is further configured to:
identify, from the guide data, one or more indicators relating to one or more content assets;
compare the one or more content assets with an interest profile;
determine an interest metric reflecting a matching level between the one or more content assets and the interest profile based on the comparing; and
determine the display duration based on the interest metric.

15. The system of claim 10, wherein the control circuitry is further configured to determine the criticality level of the content asset at a time when the input is received by:
determining a genre of the content asset; and
querying, a criticality table, for a corresponding criticality level based on the genre.

16. The system of claim 10, wherein the control circuitry is further configured to determine the criticality level of the content asset at a time when the input is received by:
retrieving metadata associated with a content segment around the time when the input is received;
extracting one or more key terms from the metadata;
for each of the one or more key terms, querying a criticality table storing glossary terms relating to the content asset for a respective criticality score based on the respective key term; and
computing the criticality level of the content asset by taking an average of the respective criticality scores.

17. The system of claim 10, wherein the control circuitry is further configured to:
determine a first pre-defined duration based on the criticality level of the content asset;
determine a second pre-defined duration based on the characteristic of the guide data;
in response to determining that the second pre-defined duration is shorter than the first pre-defined duration, generate for display, overlaid on the content asset, the guide interface element for the second display duration; and
in response to determining that the second pre-defined duration is longer than the first pre-defined duration:
generate for display, overlaid on the content asset, the guide interface element for the first display duration; and
perform a remedial action to compensate for a shortened display duration of the guide interface element.

18. The system of claim 17, wherein the control circuitry is further configured to perform the remedial action to compensate for the shortened display duration of the guide interface element by:
sending information relating to the guide data to a secondary device; or
adjusting a format of the guide interface element to highlight one or more items contained in the guide data.

* * * * *